(12) United States Patent
Bredbeck et al.

(10) Patent No.: US 10,851,894 B2
(45) Date of Patent: Dec. 1, 2020

(54) COMPRESSOR ASSEMBLY FOR A COMPRESSED-AIR FEED OF A COMPRESSED-AIR SUPPLY SYSTEM

(71) Applicant: WABCO GmbH, Hannover (DE)

(72) Inventors: Klaus Bredbeck, Landesbergen (DE); Uwe Stabenow, Laatzen (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 16/497,458

(22) PCT Filed: Mar. 23, 2018

(86) PCT No.: PCT/EP2018/057501
§ 371 (c)(1),
(2) Date: Sep. 25, 2019

(87) PCT Pub. No.: WO2018/197123
PCT Pub. Date: Nov. 1, 2018

(65) Prior Publication Data
US 2020/0025189 A1  Jan. 23, 2020

(30) Foreign Application Priority Data
Apr. 28, 2017 (DE) .................. 10 2017 004 087

(51) Int. Cl.
*F16J 1/14* (2006.01)
*F04B 39/00* (2006.01)
(Continued)

(52) U.S. Cl.
CPC .............. *F16J 1/14* (2013.01); *F04B 9/042* (2013.01); *F04B 35/01* (2013.01);
(Continued)

(58) Field of Classification Search
CPC .......... F04B 9/047; F04B 9/042; F04B 35/01; F04B 39/022; F04B 39/005; F16J 1/12;
(Continued)

(56) References Cited

U.S. PATENT DOCUMENTS 2,946,503 A * 7/1960 Thompson .............. F04B 39/12
74/44
2003/0140729 A1  7/2003 Chou
(Continued)

FOREIGN PATENT DOCUMENTS

CH         418725 A    8/1966
DE       2424562 A1   12/1975
(Continued)

*Primary Examiner* — Bryan M Lettman
(74) *Attorney, Agent, or Firm* — Leydig, Voit & Mayer, Ltd.

(57) ABSTRACT

A compressor assembly for a compressed-air feed of a compressed-air supply system for operating a pneumatic system includes a compressor having a con-rod, a con-rod bearing, and a cylinder. The con-rod has a compressor piston. The compressor assembly further includes a drive having a drive shaft and a drive housing. The drive shaft is mounted in a drive bearing that is disposed within the drive housing. The drive bearing and the con-rod bearing partially or completely overlap one another in the axial direction, or the axial central plane of the drive bearing and the axial central plane of the con-rod bearing lie in one bearing plane. A crank disk is fixedly connected to an end portion of the drive shaft, the crank disk having a con-rod receptacle portion that is disposed so as to be eccentric to the drive shaft, the crank disk being rotatably connected to the con-rod.

22 Claims, 7 Drawing Sheets

(51) Int. Cl.
   *F04B 9/04*    (2006.01)
   *F16J 1/22*    (2006.01)
   *F16J 9/02*    (2006.01)
   *F16J 1/20*    (2006.01)
   *F04B 35/01*   (2006.01)
(52) U.S. Cl.
   CPC ...... *F04B 39/0005* (2013.01); *F04B 39/0022* (2013.01); *F16J 1/20* (2013.01); *F16J 1/22* (2013.01); *F16J 9/02* (2013.01)
(58) Field of Classification Search
   CPC . F16J 1/16; F16J 1/14; F16J 1/20; F16J 1/22; F16J 9/02; F16J 9/04
   See application file for complete search history.

(56) References Cited

U.S. PATENT DOCUMENTS

| | | | |
|---|---|---|---|
| 2005/0238513 A1 | 10/2005 | Mueller | |
| 2012/0177524 A1* | 7/2012 | Komatsu | F01B 1/062 418/161 |
| 2013/0255787 A1* | 10/2013 | Frank | B60G 17/0523 137/1 |

FOREIGN PATENT DOCUMENTS

| | | |
|---|---|---|
| DE | 102004020104 A1 | 11/2005 |
| DE | 102005009445 A1 | 9/2006 |
| EP | 1918582 A2 | 5/2008 |
| WO | WO 200904426 A1 | 4/2009 |

* cited by examiner

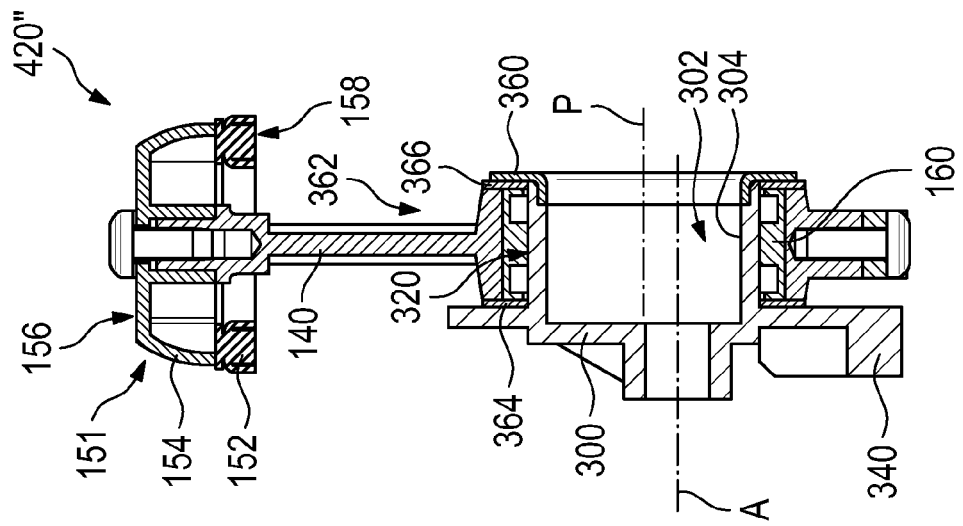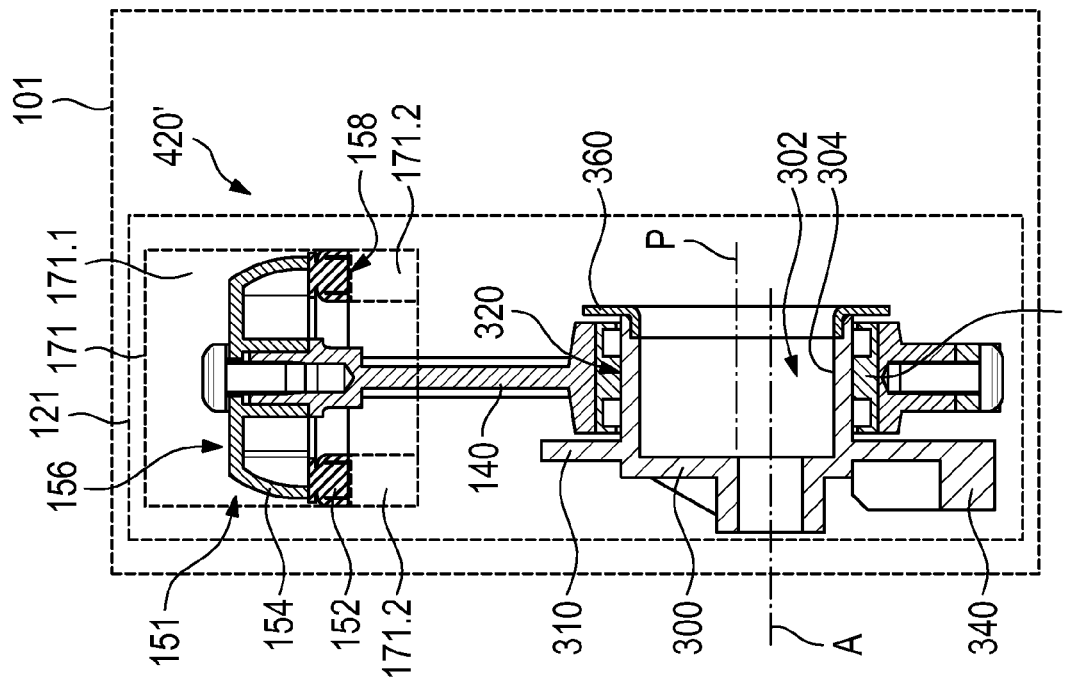

COMPRESSOR ASSEMBLY FOR A COMPRESSED-AIR FEED OF A COMPRESSED-AIR SUPPLY SYSTEM

CROSS REFERENCE TO RELATED APPLICATIONS

This application is a U.S. National Phase Application under 35 U.S.C. § 371 of International Application No. PCT/EP2018/057501, filed on Mar. 23, 2018, and claims benefit to German Patent Application No. DE 10 2017 004 087.7, filed on Apr. 28, 2017. The International Application was published in German on Nov. 1, 2018 as WO 2018/197123 under PCT Article 21(2).

FIELD

The invention relates to a compressor assembly for a compressed-air feed of a compressed-air supply system for operating a pneumatic system, having a compressor having at least one con-rod, a con-rod bearing, and a cylinder, wherein the con-rod has a compressor piston, a drive having a drive shaft, a drive housing, wherein the drive shaft is mounted in at least one drive bearing that is disposed within the drive housing. The invention also relates to a compressed-air supply system for operating a pneumatic system.

BACKGROUND

Compressors, in particular compressors in compressed-air supply systems in vehicles, are generally known. In general, compactness, robustness, efficiency, as well as an operation that is low in terms of noise and vibration, represent important aspects in terms of the improvement of such a compressor.

Compressors which provide the adjustability of the crank mechanism to the motor shaft in order for the play in the bearing and thus the generation of noise to be reduced are known. DE 10 2005 009 445 B4 thus describes a compressor apparatus for generating compressed air in a vehicle, having a piston compressor and a motor for driving the piston compressor, wherein the piston of the latter is driven by the motor by way of a motor shaft and by way of a con-rod/crank mechanism assembly, characterized in that the crank mechanism on the motor shaft, when assembling the compressor apparatus, is adjustable in the longitudinal direction of the motor shaft.

A compressor assembly of DE 10 2004 020 104 A1 shows a twin piston for a compressor, having an elongate piston support which has one piston at each end, and having a con-rod which runs so as to be approximately parallel to the piston support and which by means of a drive bearing is rotatably mounted on a pin of the piston support and in a manner spaced apart from the latter by means of a con-rod bearing is capable of being mounted on an eccentric of a drive installation; the drive bearing and the con-rod bearing, in a spaced-apart manner, thus lie on top of one another in approximately the same axial direction. In a central region which extends between both pistons the piston support includes an intermediate space which is dimensioned so as to receive the con-rod in a freely movable manner and in which the con-rod is received in a freely movable manner.

Furthermore, methods for the direct balancing of masses in the case of piston machines are known. DE 2424562 A1 describes a method of directly balancing masses. The direct balancing of masses is characterized in that the piston has the center of gravity thereof in the rotation axis of said piston about the piston pin, a balancing weight is attached to the con-rod, and the system of all oscillating parts is dynamically balanced such that the common center of gravity is situated in the rotation axis of the crank shaft.

SUMMARY

In an embodiment, the present invention provides a compressor assembly for a compressed-air feed of a compressed-air supply system for operating a pneumatic system. The compressor assembly includes a compressor having a con-rod, a con-rod bearing, and a cylinder. The con-rod has a compressor piston. The compressor assembly further includes a drive having a drive shaft and a drive housing. The drive shaft is mounted in a drive bearing that is disposed within the drive housing. The drive bearing and the con-rod bearing partially or completely overlap one another in the axial direction, or the axial central plane of the drive bearing and the axial central plane of the con-rod bearing lie in one bearing plane. A crank disk is fixedly connected to an end portion of the drive shaft, the crank disk having a con-rod receptacle portion that is disposed so as to be eccentric to the drive shaft, the crank disk being rotatably connected to the con-rod by way of the con-rod bearing.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 5A, 5B show in each case a sectional view of the mass system including the crank disk, the con-rod, the con-rod bearing, and the compressor piston, for illustrating embodiments of a run-on protection;

DETAILED DESCRIPTION

Figure 1:
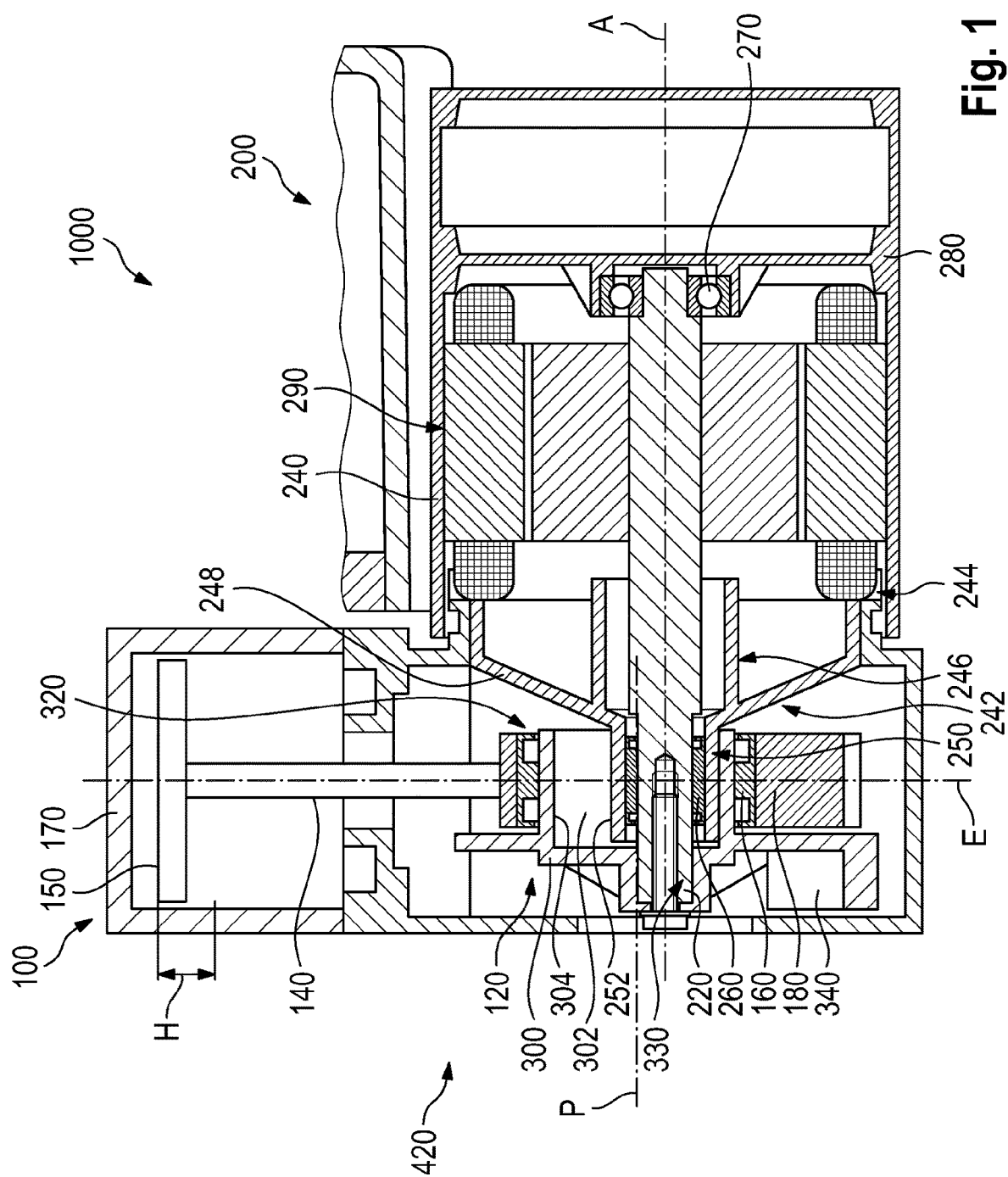
FIG. 1 shows a compressor assembly according to a particularly preferred embodiment, having an axial overlap of the bearings.

Construction modes of compressor assemblies can be improved with a view to an operation that is low in terms of noise and vibration.

It is therefore desirable for the functionality of a compressor assembly, in particular of the mechanical coupling of the drive and the compressor, to be improved in terms of noise and vibration.

Embodiments of the invention specify an improved compressor assembly that, in particular, addresses the problems described above.

Embodiments of the invention provide compressor assemblies for a compressed-air feed of a compressed-air supply system for operating a pneumatic system, having a compressor having at least one con-rod, a con-rod bearing, and the cylinder, wherein the con-rod has a compressor piston, a drive having a drive shaft, a drive housing, wherein the drive shaft is mounted in at least one drive bearing that is disposed within the drive housing.

According to embodiments of the invention, compressor assemblies are provided in which the drive bearing and the con-rod bearing partially or completely overlap one another in the axial direction, or the axial central plane of the drive bearing and the axial central plane of the con-rod bearing lie in one bearing plane.

According to embodiments of the invention, compressor assemblies are provided in which a crank disk is fixedly connected to an end portion of the drive shaft, and furthermore the crank disk on a con-rod receptacle portion that is disposed so as to be eccentric to the drive shaft is rotatably connected to the con-rod by way of the con-rod bearing.

The invention proceeds from the concept that a spacing in the axial direction between the axial central plane of the drive bearing and the axial central plane of the con-rod bearing leads to a bending moment which results in particular in a deformation of the drive shaft. A deformation of this type in the case of a rotating drive shaft leads to disadvantageous dynamic stress states and to the generation of noise and vibration. Generation of noise and vibration of this type can optionally be further amplified by way of a play in the bearing that increases over the operating time. Such deformations are in particular to be traced back to con-rod forces which when compressing the air are created by the movement of the compressor piston in the cylinder and by way of the con-rod bearing and/or the drive bearing are directed into the drive shaft. The bending moment herein is proportional to the con-rod forces and the spacing in the axial direction between the axial central plane of the drive bearing and the axial central plane of the con-rod bearing.

The invention has recognized that the bending moment acting on the drive shaft is reduced a reduction in the spacing in the axial direction between the axial central plane of the drive bearing and the axial central plane of the con-rod bearing. A reduction can be achieved in particular when the drive bearing is disposed in the radial direction within the con-rod bearing. A bending moment caused by con-rod forces and acting on the drive shaft is in particular completely avoided in the case of a complete avoidance of the spacing in the axial direction between the axial central plane of the drive bearing and the axial central plane of the con-rod bearing.

According to embodiments of the invention it is therefore advantageously provided that the drive bearing and the con-rod bearing partially or completely overlap one another in the axial direction.

A refinement of this type having an overlapping disposal leads to the advantage that the spacing in the axial direction between the axial central plane of the drive bearing and the axial central plane of the con-rod bearing is reduced and thus has a positive influence in terms of avoiding bending moments which are caused by con-rod forces and act on the drive shaft.

In the context of a particularly preferred refinement it is provided that the axial central plane of the drive bearing and the axial central plane of the con-rod bearing lie so as to be practically in one bearing plane. In concrete terms, this means that the central planes of the con-rod bearing and the drive bearing are situated so as to be practically in a common plane.

A refinement of this type leads to the advantage that the spacing in the axial direction between the axial central plane of the drive bearing and the axial central plane of the con-rod bearing is practically zero and thus bending moments caused by con-rod forces and acting on the drive shaft are thus reduced to a negligible minimum, are in particular not present in practical terms.

The invention furthermore proceeds from the concept that the masses of the compressor assembly that are not dynamically balanced and accelerated in operation, in particular the con-rod, the crank disk, and the drive shaft, in operation lead to the generation of noise and vibration. The masses moved in a linear and rotating manner lead to forces and moments which negatively influence the operation of the compressor assembly in terms of the generation of noise and vibration.

The invention has therefore furthermore recognized that a dynamic balancing of the entire system of moving masses, in particular of the mass system composed of the compressor piston, the con-rod, and the crank disk, in particular including all of the required fastening elements, mounting elements and guiding elements, in operation leads to an advantageous reduction or avoidance, respectively, of noises and vibrations. Balancing weights on the con-rod as well as on the crank disk can in particular be used for dynamic balancing.

According to the invention, in placing the center of gravity of the mass system in the rotation axis of the drive shaft negative mechanical effects such as vibrations, the generation of structural and aerodynamic noise caused in particular by bending moments can be suppressed. This is in particular achieved by virtue of the innovative dynamic balancing of the bearing assembly by way of which the center of gravity of said bearing assembly is disposed in such a manner that bending moments are reduced. An operation that is low in terms of noise and vibration is in particular very important in the case of vehicles in the passenger motor vehicle sector since here the acoustic requirements are higher or more sensitive, respectively, as opposed to applications in the commercial motor vehicle sector.

Embodiments of the invention provide compressor assemblies that function in an improved manner and that are low in terms of vibration and noise. Furthermore, a reduction of forces and/or moments, as well as a reduction in particular of the dynamic stresses and vibrations associated with the forces and/or moments, lead to a more gentle operating mode which have a positive effect in terms of the efficiency and the longevity of the compressor assembly.

Advantages of embodiments of the invention are achieved on account of the disposal of the bearings, in particular of a con-rod bearing and of a drive bearing, in a manner free of any bending moment in one plane. On account of the advantageous disposal of the individual moving components, in particular of the con-rod, the crank disk, the compressor piston, in a mass system a practically completely oscillating as well as a practically rotary balancing of masses of the mass system is achieved, in particular when interacting with the foregoing, and thus in particular a compressor assembly that is low in terms of vibration and noise.

The crank disk, the drive bearing, and the con-rod bearing are preferably disposed in such a manner that the drive bearing in the radial direction is at least partially situated within the con-rod bearing. This means above all that, when viewed in a projection plane perpendicular to the rotation axis, the external diameter of the drive bearing is situated completely within the internal diameter of the con-rod bearing; this is illustrated in exemplary manner in FIGS. 2A-2C. In the context of the refinement this can above all mean that the drive bearing in the axial direction is displaced along the rotation axis in the direction of the con-rod bearing or of the drive, thus laterally displaced, in such a manner that said drive bearing in terms of the axial extent thereof is situated entirely or partially within the con-rod bearing interior space. This can advantageously also mean in particular that the drive bearing is disposed so as to be displaced along the rotation axis of the drive in the direction of the con-rod bearing in such a manner that said drive bearing by way of a defined spacing, referred to as an overlap, protrudes into a con-rod bearing interior space of the con-rod bearing. The case in which the drive bearing is completely situated in the con-rod bearing interior space is referred to as a complete overlap.

In the case of the contemporaneous disposal of the drive bearing within the con-rod bearing, when viewed in the radial direction, and according to the first aspect of the invention, this leads to a particularly advantageous configuration.

It is provided in particular that a flange region for receiving the drive bearing is formed as part of a drive housing cover that is configured on the drive housing, and the drive bearing is fastened within the flange region.

This can mean in particular that the drive bearing is not received directly in the drive housing but in a cover, the drive housing cover, that is connected to the drive housing. The disassembly of the drive is in this way simplified with the view to the drive shaft being likewise disassembled by removing the drive housing cover, in particular without releasing further connections.

In the context of a particularly preferred refinement it is provided that the drive housing comprises a motor, in particular an electric motor, and at the con-rod side is covered by means of the drive housing cover, wherein the drive housing cover at the con-rod side tapers, in particular in a conical manner, toward the flange region.

This leads in particular to the advantage, in particular in the case of configuration of the drive housing cover that tapers in the direction of the bearing plane and protrudes into the compressor housing, that the drive bearing can be particularly advantageously positioned within the bearing plane according to the invention. It is advantageously avoided in particular in this way that bending moments which have an effect on the drive bearing and the drive shaft are created by virtue of con-rod forces.

It is advantageously provided that the drive bearing is fastened, in particular in a force-fitting manner, in particular by way of a press-fit, within the flange region.

It is provided in particular that the flange region is configured for internally receiving the drive bearing and protrudes into the crank disk.

In the context of a particularly preferred refinement it is provided that the crank disk encompasses the flange region by way of a pot-type recess of the crank disk that lies on the internal side of the con-rod receptacle portion and is open toward the drive housing cover.

It is advantageously provided that the pot-type recess of the crank disk lies on the flange region, specifically an external side of the flange region and an internal side of the pot-type recess being radially opposite one another and/or guiding one another.

It is in particular provided that the crank disk is fixedly connected in a force-fitting manner, in particular in a friction-fitting manner, by way of a conical seat of the crank disk on the end portion, and/or the crank disk fixedly sits on the end portion of the drive shaft by way of a press-fit. For a conical seat, the end portion would have to be configured in a conical manner, that is to say so as to taper in particular toward the end of the drive shaft that protrudes from the housing. In this way, the crank disk which in a corresponding manner likewise has a conical hollow receptacle that matches the conical end portion would have to be placed onto the end portion and be axially fixed thereon. This can mean that counter holding has to be possible at the other end of the drive shaft in the press-fitting procedure. However, counter holding can also be dispensed with. For example, the assembling can be performed by way of a comparatively minor axial pressing force to be applied such that a friction-fit is generated in the conical connection. The final screw-fitting is subsequently performed without any counter holding at the other end of the drive shaft.

It is advantageously provided that the drive shaft is mounted within the drive housing, in particular on the flange region, by means of the con-rod-side drive bearing, and in particular on a drive housing base by means of an opposite, motor-side, drive shaft bearing.

A con-rod balancing weight is preferably disposed on the con-rod, in particular on a side of the con-rod that faces away from the compressor piston.

It is provided in particular that the con-rod has a con-rod ring and a piston rod, wherein the con-rod balancing weight is disposed on the con-rod ring in such a manner that the center of gravity of a sub-system that includes substantially the con-rod, the con-rod bearing, and the compressor piston, by means of the disposal of the con-rod balancing weight on the con-rod is situated on the rotation axis of the con-rod bearing.

In concrete terms this means that the center of gravity of the sub-system composed of the con-rod, the con-rod bearing, and the compressor piston, on account of the fastening of a balancing weight to the con-rod, in particular to the side of the con-rod that is opposite the compressor piston, is placed onto the rotation axis of the con-rod bearing in the center of the con-rod eye.

The sub-system can thus advantageously rotate about the rotation axis of the con-rod bearing in a manner free of any linear inertia forces. The sub-system is thus practically in a dynamically balanced state.

In the context of a particularly preferred refinement it is provided that a crank-disk balancing weight with the crank disk is fixedly disposed so as to be rotatable on the crank disk, in particular in such a manner that, when the compressor piston is at an upper position of the work cycle of said compressor piston, said crank-disk balancing weight is situated on a side of the crank disk that faces away from the compressor piston. In this way, a balancing of masses about the axis A is advantageously achieved in particular in that the inertia forces of the crank-disk balancing weight counteract in particular the masses of the con-rod and the masses connected to the con-rod.

It is advantageously also possible for a mass system having a plurality of con-rods to be formed, in particular for implementing a multi-stage compressor for which a balancing of masses is then achieved according to said refinement. To this end, two con-rods can be disposed axially beside one another on one crank disk, for example. A mass system which has only one con-rod but two compressor pistons disposed in an opposite manner can likewise be advantageously formed. A mass system of this type can then be dynamically balanced according to the refinement.

It is advantageously provided the con-rod has a con-rod ring and a piston rod, wherein the con-rod balancing weight is disposed on the con-rod ring in such a manner that a center of gravity of a mass system, by means of the disposal of a crank-disk balancing weight, is situated in the rotation axis of the drive shaft, wherein the mass system includes the sub-system composed of the con-rod, the con-rod bearing, the con-rod balancing weight and the compressor piston, as well as the crank disk and optionally fastening elements for fastening the con-rod bearing or further component parts of the system.

In concrete terms this means that the sub-system composed of the con-rod, the con-rod bearing, the con-rod balancing weight, and the compressor piston, as well as the entire system composed of the crank disk, on account of the fastening of a balancing weight to the crank disk, has a center of gravity which lies on the rotation axis of the drive shaft. In this way, in a rotation about the rotation axis of the drive shaft a movement of the entire system takes place so as to be practically free of linear inertia forces, this leading in particular to an operation of the compressor assembly according to the invention that is low in terms of noise and vibration.

In the context of a particularly preferred refinement it is provided that the con-rod and the compressor piston are rigidly connected to one another, the compressor being in particular configured as a positive-displacement piston compressor. In concrete terms this means that the con-rod and the compressor piston are configured so as to be substantially integral. This leads to the advantage that fewer moving parts have to be used for coupling the drive and the compressor piston and optionally also no guide elements are required for the piston in order to receive lateral forces introduced by the con-rod. Any potential gaps between the cylinder and the compressor piston that result on account of the positive-displacement kinematic in an embodiment of this type are sealed by suitable seals, in particular piston collar seals.

It is advantageously provided that the compressor is configured as a single-stage compressor or as a multi-stage compressor, in particular a dual-stage compressor, and/or the compressor has exactly one con-rod or a plurality of, in particular two, con-rods.

In concrete terms this can mean that the gas, in particular the air, is compressed in a compression chamber. Said compression chamber is formed by the interior space of the cylinder and by the side of the compressor piston that is opposite the con-rod.

In the case of a multi-stage compressor, in particular a dual-stage compressor, this in concrete terms can mean that the gas, in particular the air, is compressed into a plurality of compression chambers. In the case of a dual-stage compressor the gas can be compressed into two compression chambers, for example, which are in each case formed by the cylinder as well as a compression piston that is capable of being impinged with pressure on both sides. The side of the compressor piston that is opposite the con-rod, conjointly with the interior space of the cylinder that lies on the proximal side of the compressor piston, herein forms the first compression chamber. Furthermore, the side facing the con-rod, conjointly with the interior space of the cylinder that lies on the distal side of the compressor piston, forms the second compression chamber.

Furthermore, a dual-stage compressor can also be implemented by means of a double con-rod which on each end has a compressor piston, said compressor pistons in each case being configured for compressing gas or air, respectively, within in each case one cylinder, wherein the cylinders are in particular disposed so as to be mutually opposite.

A refinement having one con-rod in concrete terms means that a compressor is implemented by means of a con-rod which can be configured either in a single-stage manner or else in a multi-staged manner, in particular as has been described above.

A refinement having a plurality of, in particular two, con-rods in concrete terms means that a multi-stage compressor can be implemented by the disposal of a plurality of, in particular two, pistons, wherein the pistons possess in each case one compressor piston and one con-rod. Said compressor piston and said con-rod are in particular driven by a drive shaft or a crank disk, respectively, and are advantageously disposed in such a manner that the entire system is in a practically dynamically balanced state.

It is advantageously provided that the con-rod bearing is formed as a roller bearing, in particular a ball bearing, needle bearing, cylindrical roller bearing, spherical roller bearing, or the like roller bearing, and/or the drive bearing is formed as a friction bearing or needle bearing.

In concrete terms this means that a bearing form is chosen as a function of the constructive requirements. By virtue of the linear contact with the raceway, needle bearings and cylindrical roller bearings and roller bearings having cylindrical rolling elements in general have a generally high radial load bearing capability. A needle bearing by virtue of the small rolling element diameters is additionally very compact and thus advantageously further decreases the size of the installation space of the drive. By virtue of the osculation in the rolling contacts, ball bearings have a relatively high axial and radial load bearing capability. Spherical roller bearings, by virtue of the embodiment of the rolling elements as balls and of a hollow-spherical outer ring raceway, furthermore enable a certain pendulum movement between the inner ring and the outer ring. An immunity in relation to vertical misalignment and alignment faults of the drive shaft in relation to the housing is thus achieved.

In concrete terms, the configuration of a drive bearing as a friction bearing can furthermore be achieved by a lubricated or lubrication-free friction mounting. This advantageously leads to a low-maintenance, particularly preferably maintenance-free, design of the rotatable connection since the latter, apart from the relative movement between the shaft and the bearing, does not have any moving parts, in particular any rolling elements.

It is advantageously provided that the con-rod ring on the side of the crank disk and/or on the side of the toward the drive housing cover by means of a run-on protection is delimited in an axial movement direction, in particular in the direction of the rotation axis of the con-rod bearing.

On account thereof, it is advantageously achieved that a moving space is delimited in the axial direction, that is to say in the direction of the drive axis A and a floating bearing can be used as a con-rod bearing, for example. This leads to the advantage that self-centering of the con-rod bearing can be performed by way of this axial freedom of movement, in particular no forced mounting of the con-rod thus taking place.

It is advantageously provided that an axial delimitation protection is formed by means of at least one annular disk. This can mean that an axial delimitation protection is formed by means of at least one ring, in particular at least one separate annular disk that is fixed to the crank disk. On account of an axial delimitation protection according to this refinement it is advantageously achieved that the friction between the components that move relative to one another is advantageously minimized in particular by way of a delimitation protection that is formed by annular disks. To this end, the delimitation protection, or the annular disks, respectively, can be configured from a low-friction material, in particular PTFE. It is also conceivable for the annular disks or else the run-on protection be configured from glass-fiber-reinforced plastics material.

It is advantageously provided that an axial delimitation protection is formed by a crank-flange portion and/or by an annular flange. It is thus intended to enable that an axial delimitation of the con-rod is guaranteed by means of another suitable face that in particular is locationally fixed in axial terms, in particular a crank-flange portion, or a face which is not disposed on the crank disk. Such a face that is not disposed on the crank disk can be formed, for example, by an annular flange molded on the drive housing cover or another suitable face on the drive housing, drive housing cover, compressor housing, or the like.

Embodiments of the invention also provide compressed-air supply systems for operating a pneumatic system. Said compressed-air supply system has: an aforementioned compressor assembly, an air dryer, and a valve assembly. Embodiments of the invention also provide vehicles having a compressed-air supply system and a pneumatic system, wherein the compressed-air supply system has a compressor assembly according to the invention. A compressor assembly according to the invention is particularly advantageous in the case of passenger motor vehicles, since high requirements in terms of acoustics prevail in the passenger motor vehicle sector and an operation of the compressor assembly that is low in terms of noise and vibration is of high importance, or advantageous, respectively.

Embodiments of the invention will now be described hereunder by means of the drawing. The drawing is intended to illustrate the exemplary embodiments not necessarily to scale; rather, the drawing is of schematic and/or slightly distorted form where expedient for explanatory purposes. With regard to additions to the teaching that directly emerges from the drawing, reference is made to the relevant prior art. Note here that a wide variety of modifications and changes may be made with regard to the form and the detail of an embodiment without departing from the invention. The features of the invention disclosed in the description, in the drawing and in the claims may be essential, both individually and in any desired combination, to the refinement of the invention. Furthermore, the scope of the invention encompasses all combinations of at least two of the features disclosed in the description, in the drawing and/or in the claims. The invention is not restricted to the exact form or the detail of the preferred embodiments presented and described below, nor is it restricted to a subject matter that would be limited in relation to the subject matter claimed in the claims. In the case of specified dimension ranges, it is also the intention that values lying within the stated ranges are disclosed as limit values and may be used and claimed as desired. For the sake of simplification, the same reference signs are used for identical or similar parts, or parts of identical or equivalent function.

FIG. 1 shows a compressor assembly having a compressor 100 according to an embodiment of the invention. For the purpose of compressing air, a con-rod 140 in a cylinder 170 (here illustrated in a schematic, that is to say simplified, manner) having a compressor piston 150 (likewise illustrated in a simplified manner) is moved in an oscillating manner upward and downward practically along the symmetry axis of the cylinder 170. The compressor piston 150 presently is illustrated close to the upper dead center, that is to say at the upper end of the stroke carriage H. By virtue of the fact that the embodiment shown here is a positive-displacement piston compressor, that is to say that the con-rod 140 and the compressor piston 150 are rigidly connected, the oscillating movement is indeed largely but not completely transitory. Therefore, the con-rod 140 and the compressor piston 150 in the upward and downward movement perform a tumbling movement corresponding to the kinematic.

However, an embodiment of the invention in which the compressor piston 150 and the con-rod 140 are connected in an unarticulated manner, in particular by means of a mounting, as is very commonplace in the case of piston compressors, would also be conceivable. Apart from the single-stage compressor shown, multi-stage, in particular dual-stage, compressors are also possible according to the invention. Multi-stage compressors of this type can be formed by single-piston compressors, on the one hand, which by way of correspondingly stepped pistons and cylinders, or by a piston that is impinged by pressure on multiple sides, form a plurality of compression chambers. On the other hand, multi-staged compressors of this type can be formed by multi-piston compressors, wherein the number of pistons, in particular two pistons, are disposed in such a manner that the linear inertia forces of the mass system cancel one another during the movement. In the case of a number of pistons that is larger than one, the requirement for a balancing weight, in particular for a crank-disk balancing weight 340, can thus be dispensed with.

The con-rod 140 on that side thereof that is opposite the compressor piston 150 furthermore has a con-rod eye which serves for receiving a con-rod bearing 160. The con-rod bearing 160 furthermore serves for the rotatable connection of the con-rod 140 to the crank disk 300.

The crank disk 300 furthermore has an outboard con-rod receptacle portion 320 and an inboard drive shaft receptacle portion 330. The outboard con-rod receptacle portion 320 has a cylindrical external shape which receives the inner ring of the con-rod bearing 160. The inboard drive shaft receptacle portion 330 has a cylindrical internal shape and serves for receiving the drive shaft 220. Both the con-rod bearing 160 as well as the drive bearing 260 can be fastened to the crank disk 300 in various ways. This fastening can in particular be established in a form-fitting manner, for example by way of suitable fastening elements, in a force-fitting manner by shrink-fitting, or by way of a combination of the aforementioned or further operating principles.

In order for an oscillating stroke movement of the con-rod 140 and the compressor piston 150 to be generated, the con-rod receptacle portion 320 is disposed so as to be eccentric to the rotation axis A of the drive shaft. This means that the symmetry axis of the drive shaft receptacle portion 330 that lies on the rotation axis A is disposed so as to be parallel but offset to the symmetry axis of the con-rod receptacle portion 320 that lies on the rotation axis P of the con-rod bearing.

The drive shaft 220 serves for transmitting the rotating movement generated by a drive 200 to the crank disk 300. The drive shaft 220 in the present refinement is mounted in a drive housing 240 by means of a con-rod-side drive bearing 260 and a motor-side drive shaft bearing 270. In the context of the further description the con-rod-side drive shaft bearing is also referred to as the drive bearing 260. The drive shaft 220 presently is driven by way of an electric motor 290.

According to the invention, and in particular for disposing the axial central planes of the drive bearing 260 and the con-rod bearing 160 in one bearing plane E, the drive bearing 260 is disposed in a flange region 250 that protrudes from the drive housing 240.

The flange region 250 presently is formed as part of the drive housing cover 242. The drive housing cover 242 in the embodiment illustrated is configured in such a manner that said drive housing cover 242 is inserted into the drive housing 240, in particular in the assembled state is held in a form-fitting manner between the drive housing 240 and the compressor housing 120, by means of a latching portion 244.

A cover portion 248 which tapers in a conical manner and protrudes into the interior space of the compressor housing 120 and which in particular closes off the radial void between the drive housing 240 and the drive shaft 220 presently adjoins the latching portion 244 in the direction of the bearing plane E. The flange region 250 adjoins the cover portion 248 farther axially in the direction of the bearing plane.

Said cover portion 248 is configured such that it can receive the drive bearing 260 in such a manner that the axial central plane EA of the drive bearing 260 is disposed in the bearing plane E and according to the invention is thus in a state that is practically free of any bending moment. A tube portion 246 which serves in particular for further reinforcement and stabilization above all against the background of the bearing forces of the drive bearing 260 that are to be received in the operation of the compressor 100 is furthermore disposed on the cover portion in the axially opposite direction, thus the direction into the interior space of the drive housing 240.

In this way, bending moments that act on the drive shaft 220 are substantially reduced or avoided, respectively, since practically all con-rod forces engage within the bearing plane E and practically no lever arm for a bending moment acting on the drive shaft 220 can thus be created. Since the crank disk 300 in this embodiment, caused by the disposal of the con-rod bearing 160 and the drive bearing 260 in one bearing plane E, extends in the regions outside the bearing plane E, moments too act within the crank disk 300. The effects of said moments, in particular deformations, can be reduced to a negligible level by a correspondingly stable design of the crank disk 300. The lever arm which in this embodiment still exists between the drive shaft receptacle portion 330 and the axial central plane of the drive bearing 260 in terms of the negative effect of bending moments on the drive shaft, as described at the outset, can be neglected in this embodiment.

Alternatively, the drive shaft receptacle portion 330 could be extended in the axial direction in the direction of the drive bearing 260 such that said drive shaft receptacle portion 330 extends to below the inner ring of the drive bearing 260. In this case, the inner ring of the drive bearing 260 would sit on a tubular extension of the crank disk 300, and all of the bending moments outside the bearing plane E would be completely received by the crank disk 300. The drive shaft 220 would thus be completely relieved of any bending moments caused by con-rod forces.

Figure 2C:
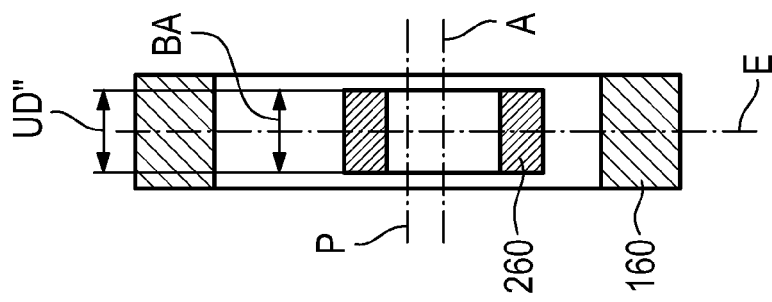
FIGS. 2A-2C show different disposals of the drive bearing and the con-rod bearing for achieving different axial overlaps of the bearings.
Figure 2B:
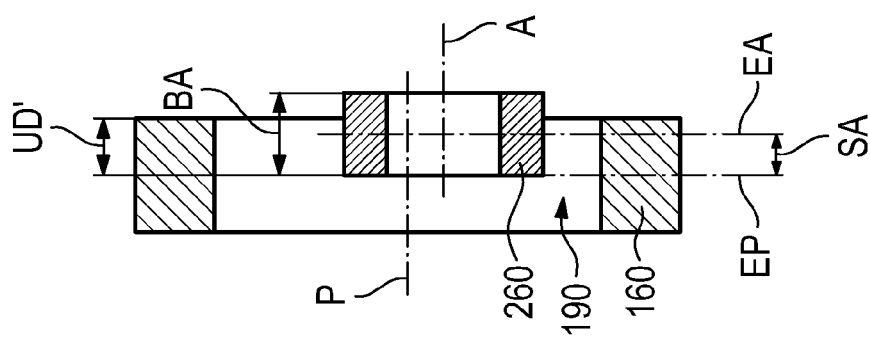
Figure 2A:
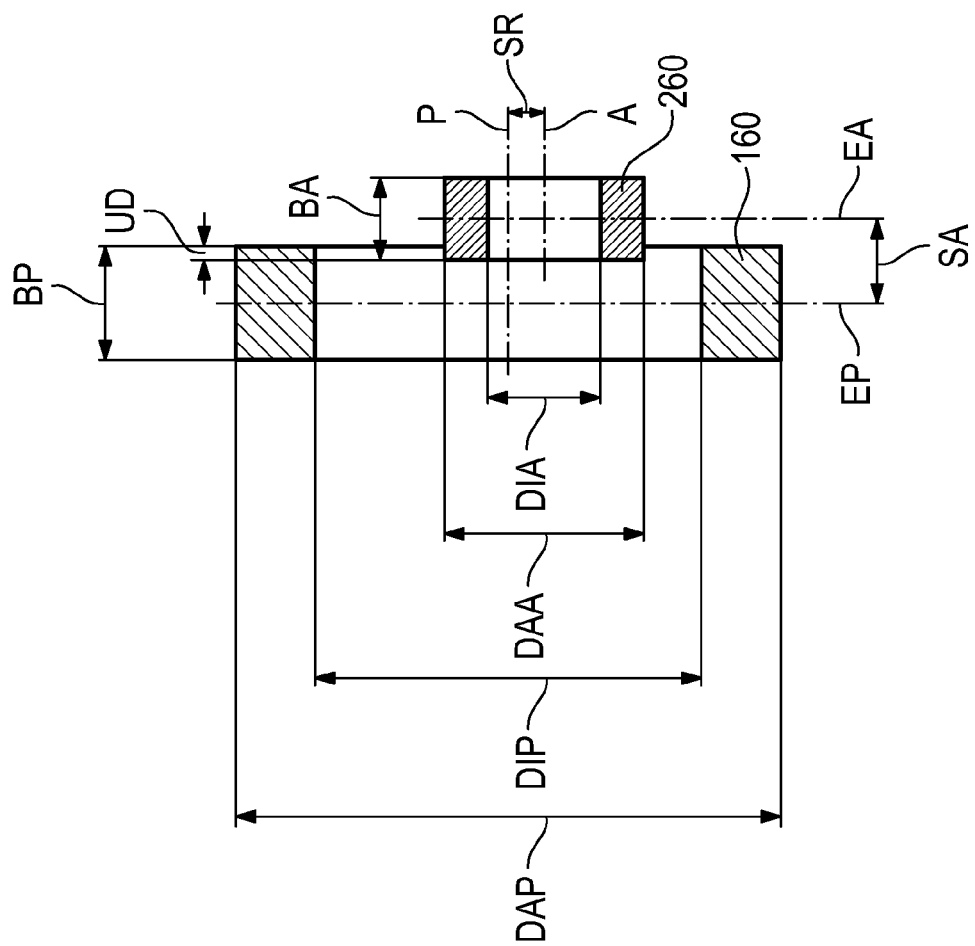

FIG. 2A-FIG. 2C show different disposals of the drive bearing and the con-rod bearing according to the invention. For clarity, substantial spacings and dimensions of the bearing assembly are illustrated in FIG. 2A.

According to the invention, the con-rod bearing 160 and the drive bearing 260 are disposed in such a manner that the drive bearing 260 in the radial direction is situated within the con-rod bearing 160. This means that the external diameter DAA of the drive bearing 260, when viewed in a projection plane perpendicular to the rotation axis A, is completely situated within the internal diameter DIP of the con-rod bearing 160. As is shown in the present refinements, the external diameter DAA of the drive bearing 260 can indeed be smaller than the internal diameter DIP of the con-rod bearing 160.

The con-rod bearing 160 furthermore has an external diameter DAP which is configured for producing a suitable fit with the con-rod eye of the con-rod 140. The internal diameter DIA of the drive bearing 260 is also configured in such a manner that said internal diameter DIA enables a fit on the drive shaft 220 according to the construction of the refinement.

The con-rod bearing 160 in the axial direction has a width BP. The drive bearing 260 in the axial direction has a width BA. The con-rod bearing 160 furthermore has a con-rod bearing interior space 190. Said con-rod bearing interior space 190 corresponds to a cylindrical cavity having the radial diameter DIP and the axial width BP.

The spacing SR refers to the radial spacing between the rotation axis P of the con-rod bearing 160 and the rotation axis A of the drive bearing 260 that runs parallel to said rotation axis P. Said spacing SR is thus a measure for the eccentricity of the crank disk 300 and simultaneously defines the stroke travel H of the compression piston 150. The correlation between the stroke travel H and the spacing SR is practically as follows: $H=2*SR$.

A refinement in which the con-rod bearing 160 and the drive bearing 260 partially overlap one another is illustrated in FIG. 2A. This means that the drive bearing 260 in the axial direction along the rotation axis A is displaced in the direction of the con-rod bearing 160 in such a manner that said drive bearing 260 is partially situated within the con-rod bearing interior space 190. This displacement, presently in the direction of the drive 200 according to FIG. 1 (toward the right in FIG. 2A, FIG. 2B) is defined by an axial spacing SA between the axial central plane EP of the con-rod bearing 160 and the axial central plane EA of the drive bearing 260. In an alternative modification, this displacement can also be implemented in the direction away from the drive 200 according to FIG. 1 (this would be toward the left in FIG. 2A, FIG. 2B).

The larger the axial spacing SA, the larger the bending moments which act on the drive shaft 220 and are caused by con-rod forces and which are to be reduced or avoided, respectively, according to the invention.

That axial spacing by way of which the drive bearing 260 protrudes into the con-rod bearing interior space 190 is referred to here as the overlap UD. This overlap UD results from the width BP of the con-rod bearing 160, the width BA of the drive bearing 260, and the axial spacing SA, as can be seen in FIG. 2A.

In the refinement illustrated in FIG. 2A, the overlap UD is comparatively minor; in particular, the drive bearing 260 by way of a spacing UD protrudes to a lesser extent into the con-rod bearing interior space 190, said spacing UD being less than half of the axial width BA of said drive bearing 260. This case can be expressed by the following correlation: $UD<0.5*BA$.

When there is no overlap, the invention can be implemented in principle in another embodiment not shown here. It is demonstrated that this would be acceptable, in any case in the embodiment not shown here, as long as the axial spacing SA is sufficiently minor so as to avoid a lever arm for the bending moments that act on the drive shaft 220 and are caused by con-rod forces. The value SA=BP+BA is considered a guide value for a maximum axial spacing SA.

A further potential disposal of the con-rod bearing 160 and the drive bearing 260 is illustrated in FIG. 2B. It is essential herein that the overlap UD' is larger than the overlap UD of the refinement illustrated in FIG. 2A. The drive bearing 260 by way of an overlap UD' protrudes into the con-rod bearing interior space 190, said overlap UD' being larger than half the axial width BA of the drive bearing 260. This case of the predominant overlap can be expressed by the following correlation: 0.5*BA<UD<BA.

It likewise applies to the refinement illustrated here that the axial spacing SA is decreased as compared to the refinement illustrated in FIG. 2A. This advantageously results in that the lever arm for the bending moments on the drive shaft 220 and caused by con-rod forces is likewise decreased according to the invention.

FIG. 2C finally shows a third potential bearing assembly in which the axial central plane EP of the con-rod bearing 160 and the axial central plane EA of the drive bearing 260 advantageously coincide in one bearing plane E. This means that the axial spacing SA is equal to zero and there is practically no lever arm for forces directed from the con-rod 140 into the drive shaft 220. In this way, a creation of bending moments is particularly advantageously avoided according to the invention. The fact that the drive bearing 260 in the axial direction is disposed in such a manner that said drive bearing 260 is completely situated in the con-rod bearing interior space 190 leads to a complete overlap UD", meaning that UD"=BA.

Figure 3A:
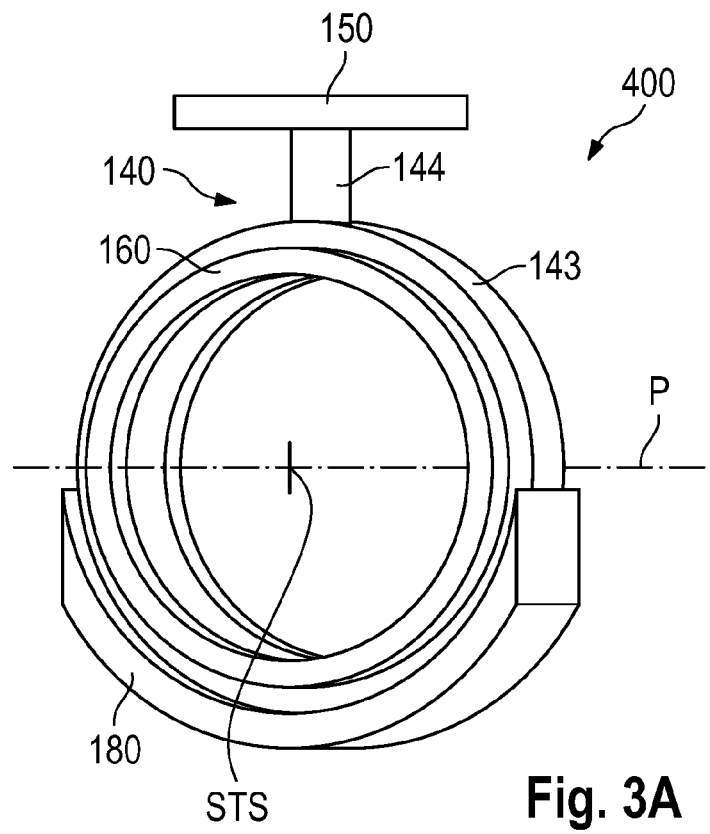
FIG. 3A shows a sub-system of moving masses having the con-rod, the compressor piston, the con-rod bearing, and a con-rod balancing weight.
Figure 3B:
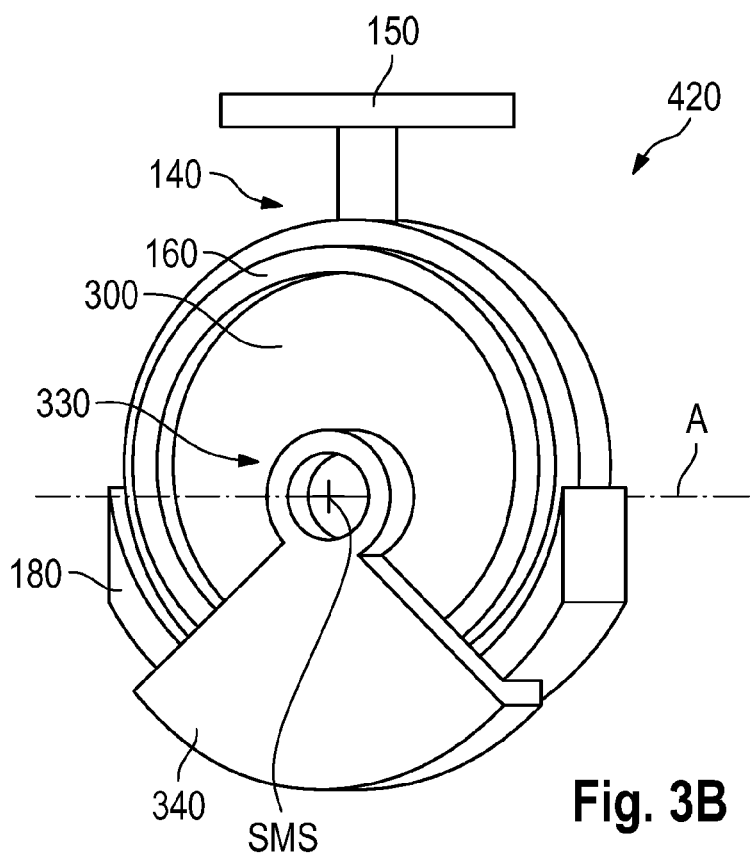
FIG. 3B shows a dynamically balanced system composed of a sub-system and a crank disk.

Furthermore, in this embodiment according to the invention, balancing weights 180, 340 dynamically balancing a mass system 420 are disposed on both the con-rod 140 as well as on the crank disk 300, as is schematically illustrated hereunder in FIG. 3A and in FIG. 3B. For this purpose, a con-rod balancing weight 180 is disposed on the con-rod 140. Furthermore, a crank disk balancing weight 340 is disposed on the crank disk 300. The con-rod 140 has a con-rod ring 143 and a piston rod 140 which is connected, in particular rigidly connected, to the con-rod ring 143.

It is particularly advantageous for the dynamic balancing of the entire system to be performed in two steps. In a first step it is to be ensured, in particular by way of the constructive design, that the center of gravity STS of a sub-system 400 composed of the con-rod 140, the compressor piston 150, the con-rod bearing 160, as well as all of the further required fastening elements, is situated on the rotation axis P of the con-rod bearing. Said sub-system 400 is illustrated in FIG. 3A. In order for the center of gravity STS to be repositioned in a corresponding manner onto the rotation axis P, a con-rod balancing weight 180 in particular is disposed in particular on that side of the con-rod 140 that faces away from the compressor piston 150.

In a second step, in particular by way of the constructive design, or the disposal of the components, respectively, the entire system of moving masses referred to as the mass system 420 composed of the sub-system 400 and furthermore of the crank disk 300 including all of the required fastening elements, is then disposed in such a manner that a center of gravity SMS of the mass system 420 lies on the rotation axis A of the drive shaft 220. The mass system 420 is illustrated in FIG. 3B.

To this end, a crank disk balancing weight 340 is in particular disposed on the crank disk 300.

In this way, and in particular by way of from the use of the balancing weights 180, 340, it is ensured that all of the forces created by the movements or accelerations, respectively, within the entire system 420 are practically balanced. In this way, an operation of the compressor assembly 1000 that is low in terms of noise and vibration is enabled according to the invention.

Figure 4:
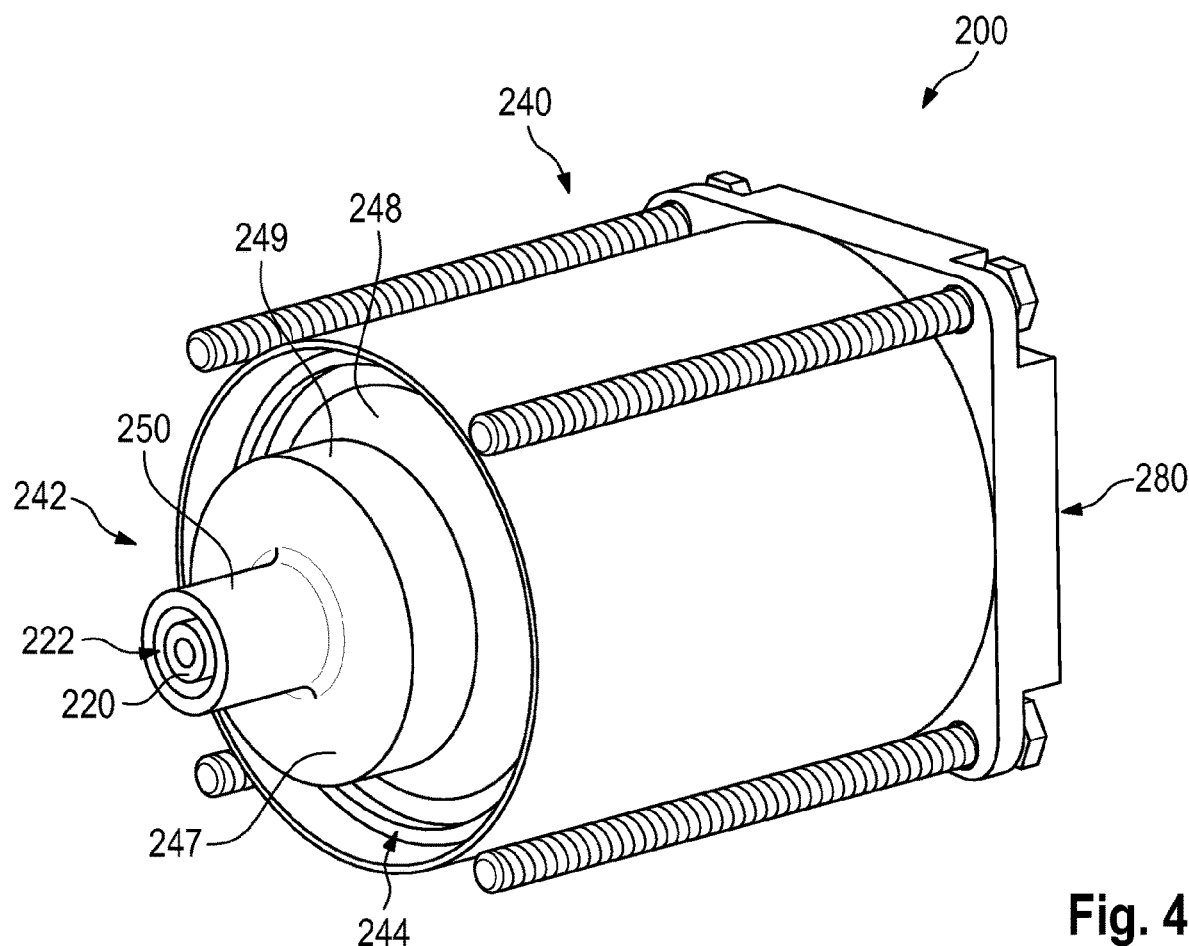
FIG. 4 shows a view of a drive having a drive housing.

FIG. 4 shows a view of a drive 200 having a drive housing 240 according to a preferred refinement of the invention. A drive housing cover 242 which closes off the drive housing 240 can be seen. The drive housing cover 242 in turn has a flange region 250 which (not visible here) in the interior can receive a drive bearing 260. An end portion 222 of the drive shaft 220 that protrudes from the lateral opening of the flange region 250 can be seen. Said end portion 222 is configured for receiving a crank disk 300 (likewise not shown here). For this purpose, it is possible for the end portion 222 to laterally protrude even further from the flange region 250 than is shown here. The end portion 222 presently is configured so as to be cylindrical which enables the crank disk 300 to be fastened to the drive shaft 220 in particular by means of a press-fit. Nevertheless, it is possible for other possibilities of the shaft-to-hub connections used in the prior art be used in order for the crank disk 300 to be fastened to the drive shaft 220. The fastening by means of a conical seat, or a conical fit, respectively, would in particular be conceivable. To this end, the end portion 222 would however have to be configured so as to be conical, that means so as to taper toward the end of the drive shaft 220 that protrudes from the housing 240. In this way, the crank disk 300 which in a corresponding manner has a likewise conical hollow receptacle that matches the conical end portion 220 could be placed onto the end portion 220 and be axially fixed thereon.

The drive housing cover 242 furthermore has an annular flange 247 that follows the flange region 250 in the direction of the drive housing 240. Said annular flange 247 extends in the radial direction and thus enlarges the diameter of the drive housing cover 242 from the diameter of the flange portion 250 to a larger diameter of a shoulder portion 249. A chronically shaped cover portion 248 as is already illustrated in a similar form in FIG. 1 adjoins the shoulder portion 249 so as to again follow the drive housing cover 242 in the axial direction in the direction of the drive housing 240. Again following in the same direction, a latching portion 244 which represents the termination of the drive housing cover 242 and, in a manner analogous to the embodiment shown in FIG. 1, represents the connection of the drive housing cover 242 to the drive housing 240 adjoins the cover portion 248.

FIGS. 5A, 5B in each case a sectional view of a mass system having a crank disk, a con-rod, a con-rod bearing, and a compressor piston, for illustrating embodiments of a run-on protection according to a preferred refinement of the invention.

FIG. 5A shows a further preferred embodiment having a dual-stage compressor 101 (illustrated in a heavily simplified manner here) which furthermore has a compressor housing 121 as well as a cylinder 171 having a first compression chamber 171.1 and a second compression chamber 171.2. Furthermore illustrated is in particular the sectional view of a mass system 420' which has a crank disk 300 with a crank disk balancing weight 340, a con-rod 140, a con-rod bearing 160, and a compressor piston 151. The compressor piston 151 presently is configured so as to be capable of being impinged with pressure on both sides. To this end, said compressor piston 151 has a face side 156 and a stage side 158 which conjointly with a respective cylinder portion form the first compression chamber 171.1 and the second compression chamber 171.2. A seal stage 152 which in the radially inward as well as the radially outward direction seals in relation to an annular cylindrical chamber (illustrated in a heavily simplified manner here) and thus forms the second compression chamber 171.2 is fastened to a dome portion 154 which is configured so as to be hollow and is fastened to the con-rod 140.

The con-rod 140 by way of a con-rod bearing 160 which in turn is disposed on a con-rod receptacle portion 320 is rotatably connected to the crank disk 300. The con-rod bearing 160 presently is embodied as a single-row needle bearing. A flange-shaped run-on protection 360 is fastened to the crank disk 300 in a manner such that said run-on protection 360 restricts the axial moving space of the con-rod bearing 160. The axial moving space of the con-rod bearing 160 is thus delimited between a crank-flange portion 310 and the run-on protection 360. This leads to the advantage that self-centering of the con-rod bearing 160 can be performed by way of said axial degree of freedom and in particular no force mounting is thus performed.

The run-on protection 360 can be fastened, in particular releasably, to the crank disk by means of the commonplace methods of design theory. To this end, a threaded connection between a thread machined into the shell face of the run-on protection 360 and a matching thread machined into the internal side 304 of the pot-type recess 302 can be considered, for example. Nevertheless, it is possible for the run-on protection 360 to be connected to the crank disk 300 by means of adhesive bonding or shrink-fitting.

The refinement of a mass system 420" illustrated in FIG. 5B is similar to the mass system 420' shown in FIG. 5A but with the difference that the delimitation protection 362 composed of a first annular disk 364 and a second annular disk 366 is disposed between the crank-flange portion 310 and the run-on protection 360. The first annular disk 364 herein is disposed in the axial intermediate space which results between the crank-flange portion 310 and the con-rod 140, or the con-rod bearing 160, respectively. The second annular disk 366 is disposed in the axial intermediate space which results between the con-rod 140, or the con-rod bearing 160, respectively, and the run-on protection 360. The friction between the components that move relative to one another can advantageously be reduced on account of the delimitation protection 362 composed of the first annular disk 364 and the second annular disk 366. To this end, the delimitation protection 362, or the annular disks 364, 366, respectively, can be configured from a low-friction material, in particular PTFE. It is also possible for the annular disks 364, 366, or else the run-on protection 360, be configured from glass-fiber-reinforced plastics material.

Figure 6:
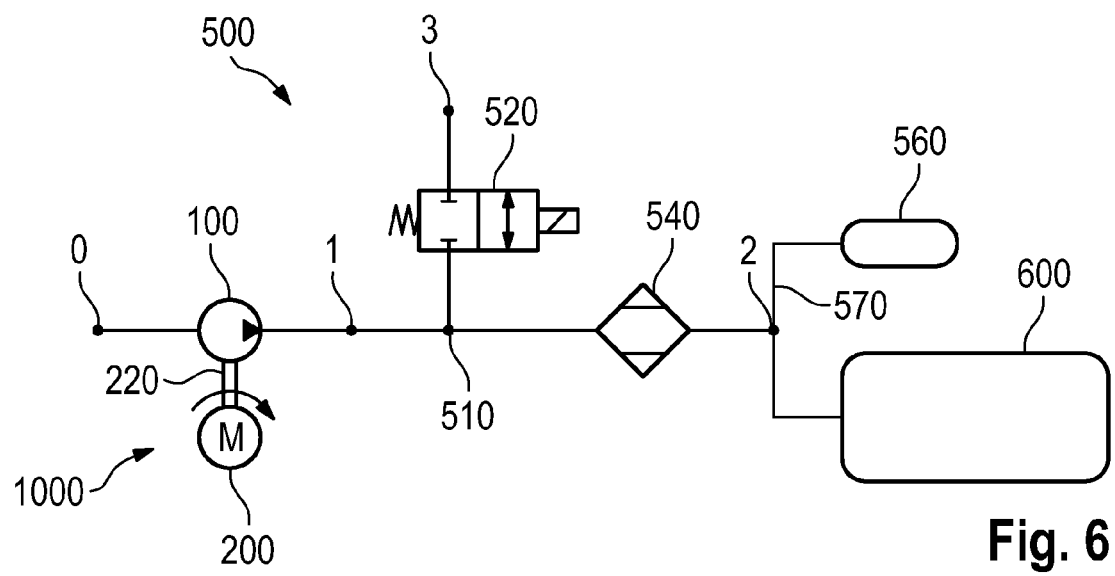
FIG. 6 shows a highly simplified, schematic overview of a compressed-air supply system.

FIG. 6 shows a heavily simplified, schematic overview of a compressed-air supply system 500 having a compressor assembly 1000 according to the invention, for supplying a pneumatic system 600. The compressed-air supply system 500 for the intake of fresh air has an air intake 0 which furthermore is fluidically connected, in particular to carry gas, to an inlet of the compressor 100. The compressor 100 as part of the compressor assembly 1000 is driven by a drive 200 by way of a drive shaft 220. The compressed fresh air is furthermore provided by way of a compressed-air source 1 which is adjoined by a branch 510. A ventilation 3 is connected to said branch 510 by way of a ventilation valve 520, on the one hand. On the other hand, an air dryer 520 which furthermore leads to a compressed-air connector 2 is connected to the branch 510. A compressed-air reservoir 560 and the pneumatic system 600 are furthermore connected to said compressed-air connector 2 by way of a gallery 570. The pneumatic system 600 can be, for example, an air-spring system, or a further pneumatic system, in particular of a vehicle. Furthermore, for reasons of clarity and simplification, individual valves, throttles, and the like actuators as well as individual components in particular of the pneumatic system are not illustrated in this illustration.

Figure 7:
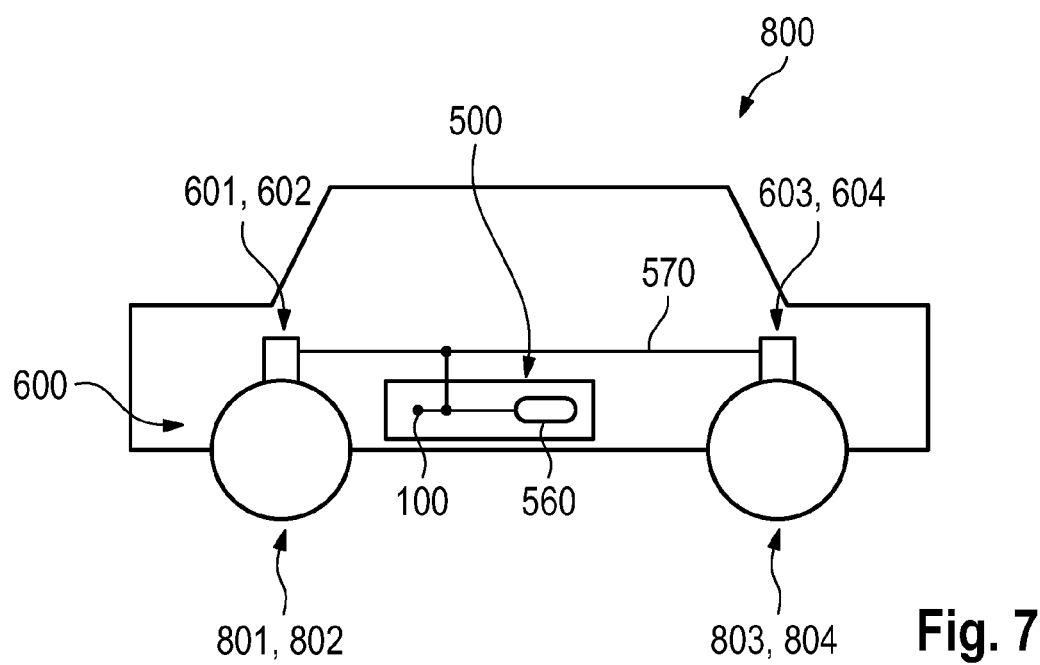
FIG. 7 shows a schematic illustration of a vehicle having a compressed-air supply system.

FIG. 7 shows a schematic illustration of a vehicle 800, presently in the form of a passenger motor vehicle, having a compressed-air supply system 500 and a pneumatic system 600. An operation that is low in terms of noise and vibration is very important in the case of vehicles in the passenger motor vehicle sector since here the acoustic requirements are higher or more sensitive, respectively, as opposed to applications in the commercial motor vehicle sector. The passenger motor vehicle 800 illustrated in an exemplary manner here for this purpose, without limiting the applicability also to commercial motor vehicles or other commercial vehicles, possesses four road wheels 801, 802, 803, and 804, of which the respective two front road wheels are shown by virtue of the sectional illustration. In a manner analogous to the number of road wheels, the pneumatic system 600 possesses four air springs 601, 602, 603, and 604 of which, in a manner analogous to the road wheels, the respective two front air springs are shown by virtue of the sectional illustration. The air springs 601, 602, 603, and 604 which are in each case assigned to the road wheels 801, 802, 803, and 804 as part of the pneumatic system 600 are supplied with compressed air from the compressed-air supply system 500. The compressed-air supply system 500 by way of the gallery 570 is fluidically connected to the components of the pneumatic system 600, in this case the air springs 601, 602, 603, and 604 illustrated here.

The compressed-air supply system 500 in this illustration is shown in a heavily simplified manner such that only the compressed-air reservoir 560 and the compressor 100 according to the invention are visible. However, the compressor 100 according to the invention in a modification (not shown here) could additionally or alternatively be used independently of the compressed-air supply system. Furthermore, a reduction of forces and/or moments, as well as a reduction in particular of the dynamic stresses and vibrations associated with the forces and/or moments, lead to a more gentle operating mode which have a positive effect in terms of the efficiency and the longevity of the compressor assembly.

FIGS. 8A-8D in a heavily schematic and exemplary manner show various potential embodiments of a compressor according to the invention. This selection of potential construction modes is not to be understood as a limiting or exhaustive, respectively, enumeration.

Figure 8A:
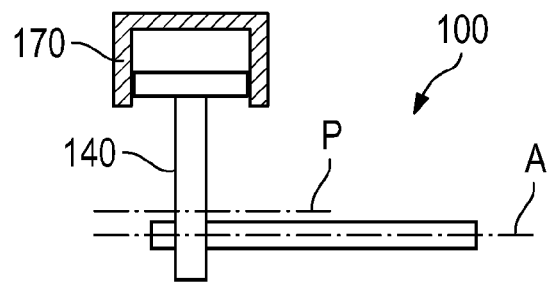
FIGS. 8A-D show in a heavily schematic and exemplary manner different potential embodiments of a compressor.

FIG. 8A shows a compressor 100 which has only one con-rod 140, one compressor piston 150, and one cylinder 170, and is configured as a single-stage compressor.

Figure 8B:
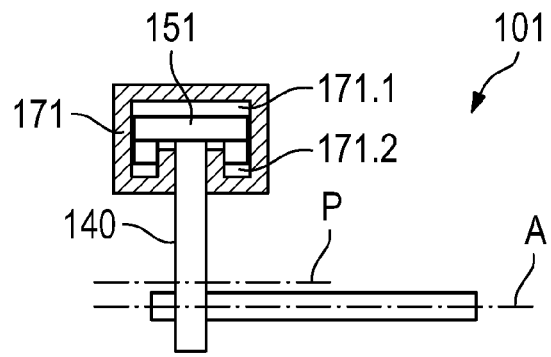

FIG. 8B shows a further refinement having a compressor 101 which corresponds substantially to the refinements illustrated in FIGS. 5A and 5B, respectively. The compressor 101 herein has one con-rod 140. Said con-rod 140 is connected to a compressor piston 151 that is capable of being impinged with pressure on both sides such that two compression chambers, specifically a first compression chamber 171.1 and a second compression chamber 171.2 are formed in one cylinder 171.

Figure 8C:
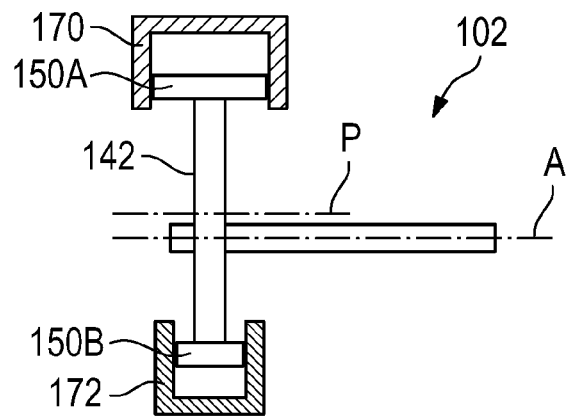

FIG. 8C shows a refinement of a compressor 102 in which a first compressor piston 150A as well as a second compressor piston 150B are disposed on one con-rod 142. The second compressor piston 150B herein is disposed on an end of the con-rod 140' that is opposite the first compressor piston 150A. Both compressor pistons, specifically the first compressor piston 150A and the second compressor piston 150B are thus driven by only the one con-rod 140'. In this way, a dual-stage compressor is implemented, specifically having a first compression stage formed by a first cylinder 170 and the first compressor piston 150A, and a second compression stage formed by a second cylinder 172 and the second compressor piston 150B. In order for a linear movement of the two compressor pistons 150A, 150B to be generated by one con-rod 142, an additional coupling element which is not illustrated in more detail here is used. A coupling element of this type can have, for example, an articulation or the like. The eccentric circular movement of the crank disk can in this way be in each case converted in particular to a stroke movement of the respective compressor pistons 150A, 150B.

Figure 8D:
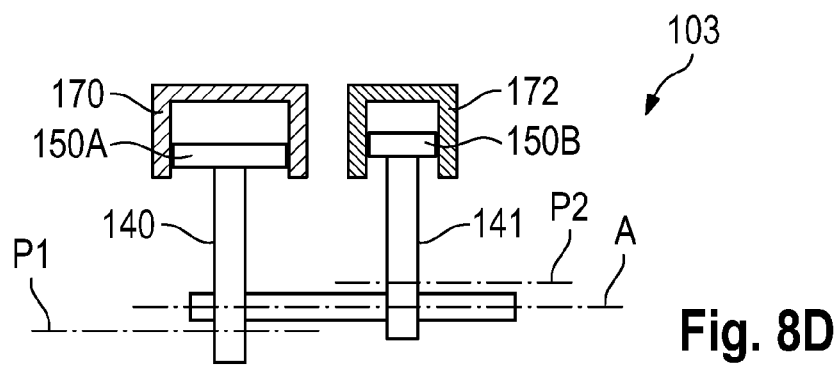

FIG. 8D shows a further embodiment of a compressor 103. In the case of this embodiment, this is a dual-stage compressor having a first con-rod 140 and a second, con-rod 141. The first con-rod 140 drives a first compressor piston 150A which in turn, conjointly with a first cylinder 170, forms a first compression chamber. In a manner analogous thereto, the second con-rod 141 drives a second compressor piston 150B which, conjointly with a second cylinder 172, forms a second compression chamber.

Both con-rods herein, specifically the first con-rod 140 and the second con-rod 141, are disposed so as to be axially offset on a drive shaft 220. Nevertheless, it is of course possible for both con-rods 140, 141 to be disposed so as to be offset in the same way on a crank disk 300 (not illustrated here). In the case of a refinement of this type it can in particular be achieved that a separate con-rod axis, and thus a separate stroke, can be set for each con-rod 140, 141 on account of a separate eccentric disposal. The con-rod 140 presently thus has a con-rod axis P1 which is different from the con-rod axis P2 of the second con-rod 141. Consequently, the compressor piston 150A and the compressor piston 150B can be moved by way of different stroke travels. However, it is also possible for both con-rods 140, 141 to be disposed beside one another on an eccentric portion such that both con-rods 140, 141 have a common con-rod axis P.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

0 Air intake
1 Compressed-air source
2 Compressed-air connector
3 Ventilation
100, 101, 102, 103 Compressor
120, 121 Compressor housing
140, 141, 142 Con-rod
143 Con-rod ring
144 Piston rod
150, 150A, 150B, 151 Compressor piston
152 Seal stage
154 Dome portion
156 Face side of the compressor piston
158 Stage side of the compressor piston
160 Con-rod bearing
170, 171, 172 Cylinder
171.1 First compression stage
171.2 Second compression stage
180 Con-rod balancing weight
190 Con-rod bearing interior space
200 Drive
220 Drive shaft
222 End portion of the drive shaft
240 Drive housing
242 Drive housing cover
244 Latching portion
246 Tube portion
247 Annular flange
248 Cover portion
249 Shoulder portion
250 Flange region
252 External side of the flange region
260 Drive bearing, con-rod-side drive shaft bearing
270 Motor-side drive shaft bearing
280 Drive housing base
290 Electric motor
300 Crank disk
302 Pot-type recess of the crank disk
304 Internal side of the pot-type recess
310 Crank-flange portion
320 Con-rod receptacle portion
330 Drive shaft receptacle portion
340 Crank disk balancing weight
360 Run-on protection
362 Delimitation protection
364 First annular disk
366 Second annular disk
400 Sub-system of moving masses
420 Mass system
500 Compressed-air supply system
510 Branch
520 Ventilation valve
540 Air dryer
560 Compressed-air reservoir
600 Pneumatic system
601, 602, 603, 604 Air spring
800 Vehicle
801, 802, 803, 804 Road wheel
1000 Compressor assembly
A Rotation axis of the drive shaft
BA Drive bearing width BP Con-rod bearing width
DAA Drive bearing external diameter
DIA Drive bearing internal diameter
DAP Con-rod bearing external diameter
DIP Con-rod bearing internal diameter
E Bearing plane
EA Axial central plane of the drive bearing
EP Axial central plane of the con-rod bearing
H Stroke travel of the compressor piston
P, P1, P2 Rotation axis of the con-rod bearing
SA Axial spacing of EA and EP
SMS Center of gravity of the mass system
SR Radial spacing of A and P
STS Center of gravity of the sub-system
UD, UD', UD" Overlap

The invention claimed is:

1. A compressor assembly for a compressed-air feed of a compressed-air supply system for operating a pneumatic system, the compressor assembly comprising:
a compressor having a con-rod, a con-rod bearing, and a cylinder, wherein the con-rod has a compressor piston; and
a drive assembly a drive shaft and a drive housing, wherein the drive shaft is mounted in a drive bearing that is disposed within the drive housing,
wherein the drive bearing and the con-rod bearing partially or completely overlap one another in an axial direction of the drive shaft,
wherein the con-rod extends, from the con-rod bearing to the compressor piston, in an axial central plane of the con-rod bearing,
wherein a crank disk is fixedly connected to an end portion of the drive shaft, the crank disk having a con-rod receptacle portion that is disposed so as to be eccentric to the drive shaft, the crank disk being rotatably connected to the con-rod by way of the con-rod bearing, and
wherein a flange region for receiving the drive bearing is formed as part of a drive housing cover that is configured on the drive housing.

2. The compressor assembly as claimed in claim 1, wherein the crank disk, the drive bearing, and the con-rod bearing are disposed in such a manner that the drive bearing in the radial direction is at least partially situated within the con-rod bearing.

3. The compressor assembly as claimed in claim 1, the drive assembly further having a motor, wherein the drive housing comprises the motor, and at a con-rod side is covered by a drive housing cover, wherein the drive housing cover at the con-rod side tapers toward the flange region.

4. The compressor assembly as claimed in claim 1, wherein the drive bearing is fastened within the flange region.

5. The compressor assembly as claimed in claim 1, wherein the flange region is configured to internally receive the drive bearing and protrudes into the crank disk.

6. The compressor assembly as claimed in claim 1, wherein the crank disk encompasses the flange region by way of a pot-type recess of the crank disk that lies on the internal side of a con-rod receptacle portion and is open toward a drive housing cover of the drive housing.

7. The compressor assembly as claimed in claim 6, wherein the pot-type recess of the crank disk lies on an external side of the flange region and an internal side of the pot-type recess being radially opposite one another and/or guiding one another.

8. The compressor assembly as claimed in claim 1, wherein the crank disk is fixedly connected in a force-fitting manner by way of a conical seat of the crank disk on the end portion, and/or the crank disk fixedly sits on the end portion of the drive shaft by way of a press-fit.

9. The compressor assembly as claimed in claim 1, wherein the drive shaft is further mounted on a drive housing base by a motor-side drive shaft bearing.

10. The compressor assembly as claimed in claim 1, wherein a con-rod balancing weight is disposed on the con-rod.

11. The compressor assembly as claimed in claim 1, wherein the con-rod has a con-rod ring and a piston rod, wherein a con-rod balancing weight is disposed on the con-rod ring in such a manner that a center of gravity of a sub-system that includes the con-rod, the con-rod bearing, and the compressor piston is situated on the rotation axis of the con-rod bearing.

12. The compressor assembly as claimed in claim 1, wherein a crank-disk balancing weight with the crank disk is fixedly disposed so as to be rotatable on the crank disk in such a manner that, when the compressor piston is at an upper position of the stroke travel of the compressor piston, the crank-disk balancing weight is situated on a side of the crank disk that faces away from the compressor piston.

13. The compressor assembly as claimed in claim 1, wherein a crank-disk balancing weight is disposed on the crank disk in such a manner that a center of gravity of a mass system, by the disposal of the crank-disk balancing weight, is situated in the rotation axis of the drive shaft, wherein the mass system includes substantially the sub-system composed of the con-rod, the con-rod bearing, and the compressor piston, as well as the crank disk.

14. The compressor assembly as claimed in claim 1, wherein the con-rod and the compressor piston are rigidly connected to one another.

15. The compressor assembly as claimed in claim 1, wherein the compressor is configured as a single-stage compressor or as a multi-stage compressor, and/or the compressor has exactly one con-rod or a plurality of con-rods.

16. The compressor assembly as claimed in claim 1, wherein the con-rod bearing is a roller bearing, and/or the drive bearing is a friction bearing or needle bearing.

17. The compressor assembly as claimed in claim 1, wherein a con-rod ring on a side of the crank disk and/or on a side of the con-rod bearing toward the drive housing cover, is by a flange shaped run on protection, delimited in an axial movement direction.

18. The compressor assembly as claimed in claim 1, wherein an axial delimitation protection is formed by at least one annular disk.

19. The compressor assembly as claimed in claim 1, wherein an axial delimitation protection is formed by a crank-flange portion and/or by an annular flange.

20. A compressed-air supply system for operating a pneumatic system, comprising:
a compressor assembly as claimed in claim 1;
an air dryer; and
a valve assembly.

21. A vehicle, comprising:
a compressor assembly as claimed in claim 1, and
a pneumatic system.

22. A compressor assembly for a compressed-air feed of a compressed-air supply system for operating a pneumatic system, the compressor assembly comprising:

a compressor having a con-rod, a con-rod bearing, and a cylinder, wherein the con-rod has a compressor piston; and a drive having a drive shaft and a drive housing, wherein the drive shaft is mounted in a drive bearing that is disposed within the drive housing, wherein the drive bearing and the con-rod bearing partially or completely overlap one another in an axial direction of the drive shaft, or an axial central plane of the drive bearing and an axial central plane of the con-rod bearing lie in one bearing plane, wherein a crank disk is fixedly connected to an end portion of the drive shaft, the crank disk having a con-rod receptacle portion that is disposed so as to be eccentric to the drive shaft, the crank disk being rotatably connected to the con-rod by way of the con-rod bearing, wherein the crank disk encompasses a flange region by way of a pot-type recess of the crank disk that lies on an internal side of a con-rod receptacle portion and is open toward a drive housing cover of the drive housing, and wherein the pot-type recess of the crank disk lies on an external side of the flange region and an internal side of the pot-type recess being radially opposite one another and/or guiding one another.

* * * * *